United States Patent
Meardi et al.

(10) Patent No.: US 12,238,334 B2
(45) Date of Patent: *Feb. 25, 2025

(54) TRANSFORMATIONS FOR SIGNAL ENHANCEMENT CODING

(71) Applicant: V-NOVA INTERNATIONAL LIMITED, London (GB)

(72) Inventors: Guido Meardi, London (GB); Ivan Damnjanovic, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 4 days.

This patent is subject to a terminal disclaimer.

(21) Appl. No.: 18/185,978

(22) Filed: Mar. 17, 2023

(65) Prior Publication Data

US 2023/0421815 A1 Dec. 28, 2023

Related U.S. Application Data

(63) Continuation of application No. 17/265,446, filed as application No. PCT/GB2019/052154 on Aug. 1, 2019, now Pat. No. 11,611,777.

(51) Int. Cl.
*H04N 11/18* (2006.01)
*H04N 19/105* (2014.01)
(Continued)

(52) U.S. Cl.
CPC ........... *H04N 19/61* (2014.11); *H04N 19/105* (2014.11); *H04N 19/122* (2014.11);
(Continued)

(58) Field of Classification Search
CPC .... H04N 19/61; H04N 19/105; H04N 19/122; H04N 19/124; H04N 19/136;
(Continued)

(56) References Cited

U.S. PATENT DOCUMENTS 11,611,777 B2 * 3/2023 Meardi ................ H04N 19/60
2005/0196052 A1 9/2005 Xin et al.
(Continued)

FOREIGN PATENT DOCUMENTS

EP 2816805 12/2014
WO 2007-011189 1/2007
(Continued)

OTHER PUBLICATIONS

International Search Report and Written Opinion for PCT/GB2019/052154 mailed Dec. 9, 2019.
(Continued)

*Primary Examiner* — Jayanti K Patel
*Assistant Examiner* — Richard B Carter
(74) *Attorney, Agent, or Firm* — Workman Nydegger

(57) ABSTRACT

Measures are provided to encode a signal. An input frame (102) is received and down-sampled to obtain a down-sampled frame (103). The down-sampled frame (103) is passed to an encoding module (104) which encodes the down-sampled frame (103) to generate an encoded frame (105). A decoded frame is obtained from a decoding module (106) which generates the decoded frame by decoding the encoded frame (105). A set of residual data (113) is generated by taking a difference between the decoded frame and the down-sampled frame (103) and is encoded to generate a set of encoded residual data. The encoding comprises transforming the set of residual data into a transformed set of residual data. The set of encoded residual data is output to a decoder to enable the decoder to reconstruct the input frame. Measures are also provided to decode a signal.

17 Claims, 12 Drawing Sheets

(51) Int. Cl.
  *H04N 19/122* (2014.01)
  *H04N 19/124* (2014.01)
  *H04N 19/136* (2014.01)
  *H04N 19/33* (2014.01)
  *H04N 19/36* (2014.01)
  *H04N 19/44* (2014.01)
  *H04N 19/46* (2014.01)
  *H04N 19/60* (2014.01)
  *H04N 19/61* (2014.01)
  *H04N 19/70* (2014.01)
  *H04N 19/91* (2014.01)
  *H04N 19/93* (2014.01)

(52) U.S. Cl.
  CPC ......... *H04N 19/124* (2014.11); *H04N 19/136* (2014.11); *H04N 19/33* (2014.11); *H04N 19/36* (2014.11); *H04N 19/44* (2014.11); *H04N 19/46* (2014.11); *H04N 19/60* (2014.11); *H04N 19/70* (2014.11); *H04N 19/91* (2014.11); *H04N 19/93* (2014.11)

(58) Field of Classification Search
  CPC ........ H04N 19/33; H04N 19/36; H04N 19/44; H04N 19/46; H04N 19/60; H04N 19/70; H04N 19/91; H04N 19/93
  USPC ...................... 375/240.18; 382/233; 345/178
  See application file for complete search history.

(56) References Cited

U.S. PATENT DOCUMENTS

| | | | |
|---|---|---|---|
| 2011/0096990 A1* | 4/2011 | Lu | H04N 19/136 |
| | | | 382/233 |
| 2012/0113064 A1* | 5/2012 | White | G06F 3/04184 |
| | | | 345/178 |
| 2013/0314496 A1* | 11/2013 | Rossato | H04N 19/40 |
| | | | 375/240.03 |
| 2016/0014422 A1 | 1/2016 | Su et al. | |

FOREIGN PATENT DOCUMENTS

| | | |
|---|---|---|
| WO | 2013-171173 | 11/2013 |
| WO | 2014-025741 | 2/2014 |

OTHER PUBLICATIONS

Schwarz et al., "Overview of the Scalable Video Coding Extension of the H.264/AVC Standard", IEEE Transaction on Circuits and Systems for Video Technology, vol. 17, No. 9, Sep. 1, 2007, pp. 1103-1120, XP055378169, US ISSN: 1051-8215, DOI: 10.1109/TCSVT.2007.905532, retrieved from the internet on Feb. 1, 2021: URL: https://www.researchgate.net/publication/3309174_Overview_of_the_Scalable_Video_Coding_Extension_of_the_H264AVC_Standard.

Han, "Comparison of Commonly Used Image Interpolation Methods", Proceedings of the 2nd International Conference on Computer Science and Electronics Engineering (ICCSEE 2013), Mar. 23, 2013; 1077952576-1077952576, XP055576828.

"Working Draft of Low Complexity Enhancement Video Coding", 126. MPEG Meeting, Mar. 25, 2019 to Mar. 29, 2019, Geneva (Motion Picture Expert Group or ISO/IEC JTC1/SC29/WG11), No. n18454, Apr. 18, 2019, XP030208724, retrieved from the internet on Feb. 1, 2021: URL: https://mpeg.chiariglione.org/meetings/126.

Final Office Action received for U.S. Appl. No. 17/265,446, mailed on May 31, 2022, 15 pages.

Non-Final Rejection Mailed on Feb. 22, 2022 for U.S. Appl. No. 17/265,446, 15 page(s).

Notice of Allowance received for U.S. Appl. No. 17/265,446, mailed on Nov. 22, 2022, 5 pages.

Outgoing—ISA/210—International Search Report Mailed on Dec. 9, 2019 for WO Application No. PCT/GB19/052154, 11 page(s).

* cited by examiner

1200

LoQ-0 Average component decomposition

$$A_{enc} = \frac{(I_{00} + I_{01} + I_{10} + I_{11})}{4} - R_0$$

LoQ-0 Average component reformation

$$A_{reformed} = A_{invQ} - \underbrace{\frac{(H_{00} + H_{01} + H_{10} + H_{11})}{4} + R_0}$$

$$\frac{(I_{00} + I_{01} + I_{10} + I_{11})}{4} - \cancel{R_0} - \frac{(H_{00} + H_{01} + H_{10} + H_{11})}{4} + \cancel{R_0}$$

$A_{invQ}$ = Average after Dequantization
$A_{enc}$ = Encoder average before quant
$A_{reformed}$ = DD friendly reformed average
$R_0$ = Pre-upsampled data
$H_{00-11}$ = Upsampled data
$I_{00-11}$ = Original input frame

FIG. 12

TRANSFORMATIONS FOR SIGNAL ENHANCEMENT CODING

CROSS-REFERENCE TO RELATED APPLICATIONS

This application is a continuation U.S. application Ser. No. 17/265,446, filed Feb. 2, 2021, which is a 371 US Nationalization of International Application No. PCT/GB2019/052154, filed Aug. 1, 2019, which claims priority to United Kingdom Patent Application No. 1812708.4, filed Aug. 3, 2018; United Kingdom Patent Application No. 1812709.2, filed Aug. 3, 2018; United Kingdom Patent Application No. 1812710.0, filed Aug. 3, 2018; United Kingdom Patent Application No. 1903844.7, filed Mar. 20, 2019; United Kingdom Patent Application No. 1904014.6, filed Mar. 23, 2019; United Kingdom Patent Application No. 1904492.4, filed Mar. 29, 2019; and United Kingdom Patent Application No. 1905325.5, filed Apr. 15, 2019. the disclosures of which are hereby incorporated by reference herein in their entireties.

TECHNICAL FIELD

The present disclosure relates to methods and apparatuses for encoding and/or decoding signals. More particularly, the present disclosure relates to encoding and decoding video signals and image signals, but can be extended to any other type of data to be compressed and decompressed.

BACKGROUND

The methods and apparatuses described herein are based on an overall algorithm which is built over an existing encoding and/or decoding algorithm (which works as a baseline for an enhancement layer) and which works according to a different encoding and/or decoding algorithm. Examples of existing encoding and/or decoding algorithms include, but are not limited to, MPEG standards such as AVC/H.264, HEVC/H.265, etc. and non-standard algorithm such as VP9, AV1, and others.

SUMMARY

Various measures (for example, encoding and decoding methods and apparatuses) provided in accordance with the present disclosure are defined in the accompanying claims.

Further features and advantages will become apparent from the following description, given by way of example only, which is made with reference to the accompanying drawings.

BRIEF DESCRIPTION OF THE DRAWINGS

FIG. 12 shows a diagram depicting an example of how to reconstruct an average component at a decoder starting from an encoded average, $A_{enc}$.

DETAILED DESCRIPTION

The overall algorithm described herein hierarchically encodes and/or decodes a video frame, as opposed to using block-based approaches as used in the MPEG family of algorithms. The methods of hierarchically encoding a frame that are described herein include generating residuals for the full frame, and then a decimated frame and so on. Different levels in the hierarchy may relate to different resolutions, referred to herein as Levels of Quality—LOQs—and residual data may be generated for different levels. In examples, video compression residual data for a full-sized video frame may be termed as "LOQ-0" (for example, 1920×1080 for a High-Definition—HD—video frame), while that of the decimated frame may be termed "LOQ-x". In these cases, "x" denotes the number of hierarchical decimations. In certain examples described herein, the variable "x" has a maximum value of one and hence there are exactly two hierarchical levels for which compression residuals will be generated (e.g. x=0 and x=1).

Figure 1:
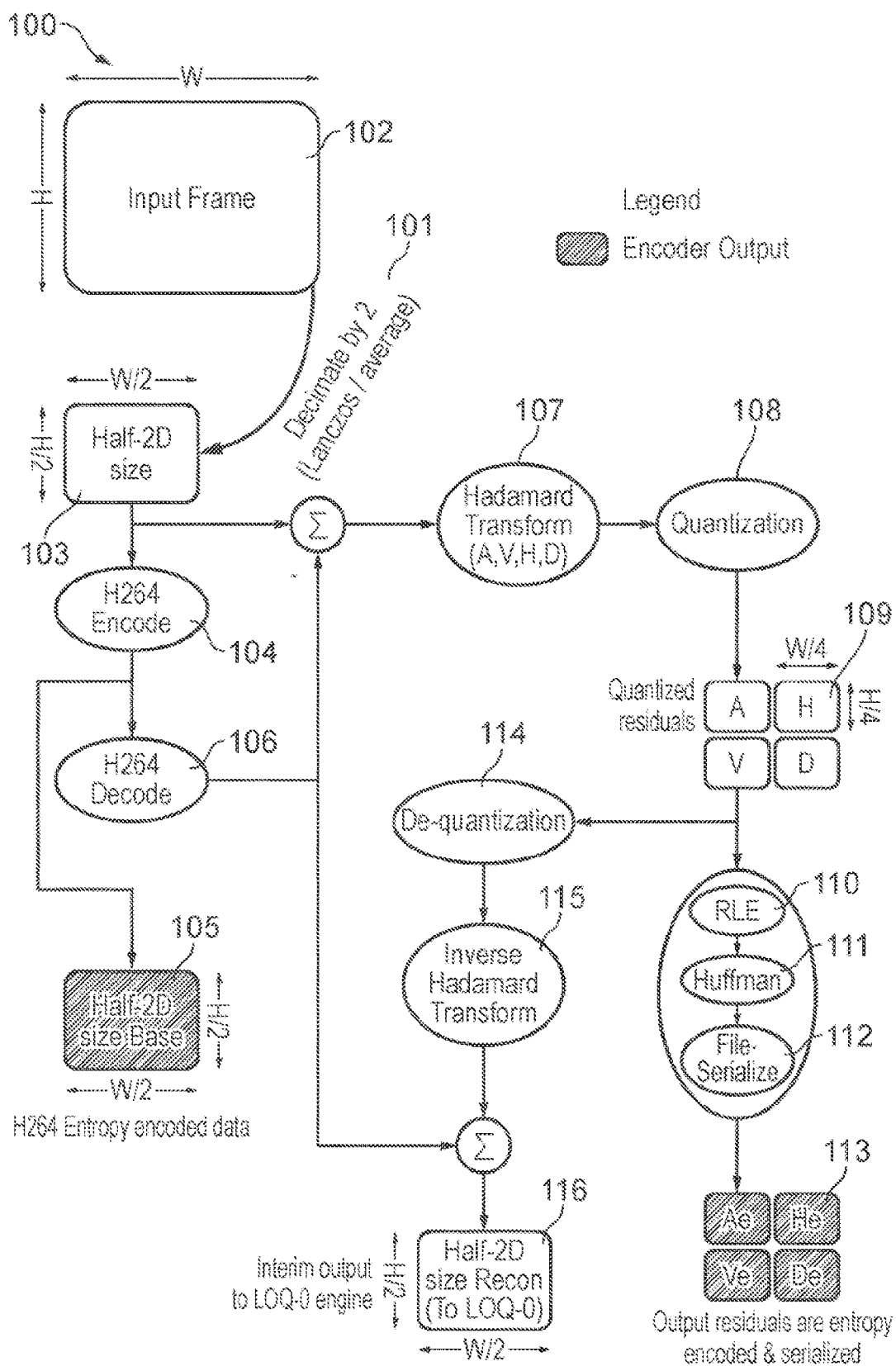
FIG. 1 shows a diagram depicting an example of LoQ-1 residual encoding.

FIG. 1 shows an example of how encoded data for one Level of Quality—LOQ-1—is generated at an encoding device.

The overall algorithm and methods are described using an AVC/H.264 encoding/decoding algorithm as an example baseline algorithm. However, other encoding/decoding algorithms can be used as baseline algorithms without any impact to the way the overall algorithm works. FIG. 1 shows the process 100 of generating entropy-encoded residuals for the LOQ-1 hierarchy level.

The first step 101 is to decimate an incoming, uncompressed video by a factor of two. This may involve down-sampling an input frame 102 (labelled "Input Frame" in FIG. 1) having height H and width W to generate a decimated frame 103 (labelled "Half-2D size" in FIG. 1) having height H/2 and width W/2. The down-sampling process involves the reduction of each axis by a factor of two and is effectively accomplished via the use of 2×2 grid blocks. Down-sampling can be done in various ways, examples of which include, but are not limited to, averaging and Lanczos resampling.

The decimated frame 103 is then passed through a base coding algorithm (in this example, an AVC/H.264 coding algorithm) where an entropy-encoded reference frame 105 (labelled "Half-2D size Base" in FIG. 1) having height H/2 and width W/2 is then generated by an entity 104 labelled "H.264 Encode" in FIG. 1 and stored as H.264 entropy-encoded data. The entity 104 may comprise an encoding component of a base encoder-decoder, e.g. a base codec or base encoding/decoding algorithm. A base encoded data stream may be output as entropy-encoded reference frame 105, where the base encoded data stream is at a lower resolution than an input data stream that supplies input frame 102.

In the present example, an encoder then simulates a decoding of the output of entity 104. A decoded version of the encoded reference frame 105 is then generated by an entity 106 labelled "H.264 Decode" in FIG. 1. Entity 106 may comprise a decoding component of a base codec. The decoded version of the encoded reference frame 105 may represent a version of the decimated frame 103 that would be produced by a decoder following receipt of the entropy-encoded reference frame 105.

In the example of FIG. 1, a difference between the decoded reference frame output by entity 106 and the decimated frame 103 is computed. This difference is referred to herein as "LOQ-1 residuals". The difference forms an input to a transform block 107.

The transform (in this example, a Hadamard-based transform) used by the transform block 107 converts the difference into four components. The transform block 107 may perform a directed (or directional) decomposition to produce a set of coefficients or components that relate to different aspects of a set of residuals. In FIG. 1, the transform block 107 generates A (average), H (horizontal), V (vertical) and D (diagonal) coefficients. The transform block 107 in this case exploits directional correlation between the LOQ-1 residuals, which has been found to be surprisingly effective in addition to, or as an alternative to, performing a transform operation for a higher level of quality—an LOQ-0 level. The LOQ-0 transform is described in more detail below. In particular, it has been identified that, in addition to exploiting directional correlation at LOQ-0, directional correlation can also be present and surprisingly effectively exploited at LOQ-1 to provide more efficient encoding than exploiting directional correlation at LOQ-0 alone, or not exploiting directional correlation at LOQ-0 at all.

The coefficients (A, H, V and D) generated by the transform block 107 are then quantized by a quantization block 108. Quantization may be performed via the use of variables called "step-widths" (also referred to as "step-sizes") to produce quantized transformed residuals 109. Each quantized transformed residual 109 has a height H/4 and width W/4. For example, if a 4×4 block of an input frame is taken as a reference, each quantized transformed residual 109 may be one pixel in height and width. Quantization involves reducing the decomposition components (A, H, V and D) by a pre-determined factor (step-width). Reduction may be actioned by division, e.g. dividing the coefficient values by a step-width, e.g. representing a bin-width for quantization. Quantization may generate a set of coefficient values having a range of values that is less than the range of values entering quantization block 108 (e.g. transformed values within a range of 0 to 21 may be reduced using a step-width of 7 to a range of values between 0 and 3). In a hardware implementation, an inverse of a set of step-width values can be pre-computed and used to perform the reduction via multiplication, which may be faster than division (e.g. multiplying by the inverse of the step-width).

The quantized residuals 109 are then entropy-encoded in order to remove any redundant information. Entropy encoding may involve, for example, passing the data through a run-length encoder (RLE) 110 followed by a Huffman encoder 111.

The quantized, encoded components (Ae, He, Ve and De) are then placed within a serial stream with definition packets inserted at the start of the stream. The definition packets may also be referred to as header information. Definition packets may be inserted per frame. This final stage may be accomplished using a file serialization routine 112. The definition packet data may include information such as the specification of the Huffman encoder 111, the type of up-sampling to be employed, whether or not A and D coefficients are discarded, and other information to enable the decoder to decode the streams. The output residuals data 113 are therefore entropy-encoded and serialized.

Both the reference data 105 (the half-sized, baseline entropy-encoded frame) and the entropy-encoded LOQ-1 residuals data 113 are generated for decoding by the decoder during a reconstruction process. In one case the reference data 105 and the entropy-encoded LOQ-1 residuals data 113 may be stored and/or buffered. The reference data 105 and the entropy-encoded LOQ-1 residuals data 113 may be communicated to a decoder for decoding.

In the example of FIG. 1, a number of additional operations are performed in order to produce a set of residuals at another (e.g. higher) level of quality—LOQ-0. In FIG. 1, a number of decoder operations for the LOQ-1 stream are simulated at the encoder.

First, the quantized output 109 is branched off and reverse quantization 114 (or "de-quantization") is performed. This generates a representation of the coefficient values output by the transform block 107. However, the representation output by the de-quantization block 109 will differ from the output of the transform block 107, as there will be errors introduced due to the quantization process. For example, multiple values in a range of 7 to 14 may be replaced by a single quantized value of 1 if the step-width is 7. During de-quantization, this single value of 1 may be de-quantized by multiplying by the step-width to generate a value of 7. Hence, any value in the range of 8 to 14 will have an error at the output of the de-quantization block 109. As the higher level of quality LOQ-0 is generated using the de-quantised values (e.g. including a simulation of the operation of the decoder), the LOQ-0 residuals may also encode a correction for a quantization/de-quantization error.

Second, an inverse transform block 115 is applied to the de-quantized coefficient values output by the de-quantization block 114. The inverse transform block 115 applies a transformation that is the inverse of the transformation performed by transform block 107. In this example, the transform block 115 performs an inverse Hadamard transform, although other transformations may be used. The inverse transform block 115 converts de-quantised coefficient values (e.g. values for A, H, V and D in a coding block or unit) back into corresponding residual values (e.g. representing a reconstructed version of the input to the transform block 107). The output of inverse transform block 115 is a set of reconstructed LOQ-1 residuals (e.g. representing an output of a decoder decoding process of LOQ-1). The reconstructed LOQ-1 residuals are added to the decoded reference data (e.g. the output of decoding entity 106) in order to generate a reconstructed video frame 116 (labelled "Half-2D size Recon (To LOQ-0)" in FIG. 1) having height H/2 and width W/2. The reconstructed video frame 116 closely resembles the originally decimated input frame 103, as it is reconstructed from the output of the decoding entity 106 but with the addition of the LoQ-1 reconstituted residuals. The reconstructed video frame 116 is an interim output to an LOQ-0 engine. This process mimics the decoding process and hence is why the originally decimated frame 103 is not used. Adding the reconstructed LOQ-1 residuals to the decoded base stream, i.e. the output of decoding entity 106, allows the LOQ-0 residuals to also correct for errors that are introduced into the LOQ-1 stream by quantization (and in certain cases the transformation), e.g. as well as errors that relate to down-sampling and up-sampling.

Figure 2:
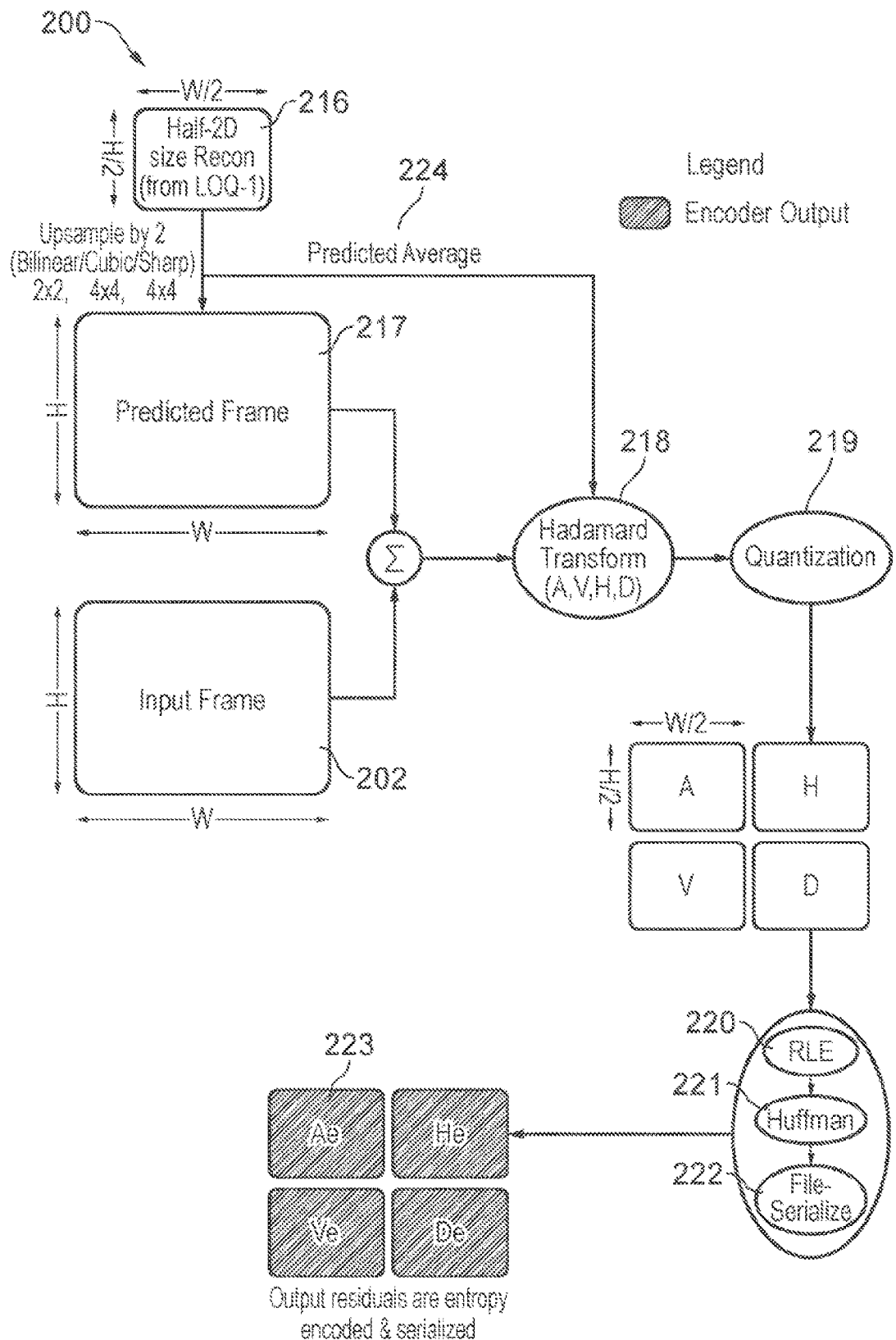
FIG. 2 shows a diagram depicting an example of LoQ-0 residual encoding.

FIG. 2 shows an example of how LOQ-0 is generated 200 at an encoding device.

In order to derive the LOQ-0 residuals, the reconstructed LOQ-1 sized frame 216 (labelled "Half-2D size Recon (from LOQ-1)" in FIG. 2) is derived as described above with reference to FIG. 1. For example, the reconstructed LOQ-1 sized frame 216 comprises the reconstructed video frame 116.

The next step is to perform an up-sampling of the reconstructed frame 216 to full size, W×H. In this example, the upscaling is by a factor of two. At this point, various algorithms may be used to enhance the up-sampling process, examples of which include, but are not limited to, nearest, bilinear, sharp or cubic algorithms. The reconstructed, full-size frame 217 is labelled as a "Predicted Frame" in FIG. 2 as it represents a prediction of a frame having a full width and height as decoded by a decoder. The reconstructed, full-size frame 217 having height H and width W is then subtracted from the original uncompressed video input 202, which creates a set of residuals, referred to herein as "LOQ-0 residuals". The LOQ-0 residuals are created at a level of quality (e.g. a resolution) that is higher than the LOQ-1 residuals.

Similar to the LOQ-1 process described above, the LOQ-0 residuals are transformed by a transform block 218. This may comprise using a directed decomposition such as a Hadamard transform to produce A, H, V and D coefficients or components. The output of the transform block 218 is then quantized via quantization block 219. This may be performed based on defined step-widths as described for the first level of quality (LOQ-1). The output of the quantization block 219 is a set of quantised coefficients, and in FIG. 2 these are then entropy-encoded 220, 221 and file-serialized 222. Again, entropy-encoding may comprise applying run-length encoding 220 and Huffman encoding 221. The output of the entropy encoding is a set of entropy-encoded output residuals 223. These form a LOQ-0 stream, which may be output by the encoder as well as the LOQ-1 stream (i.e. 113) and the base stream (i.e. 105). The streams may be stored and/or buffered, prior to later decoding by a decoder.

As can be seen in FIG. 2, a "predicted average" component 224 (described in more detail below and denoted A enc below) can be derived using data from the (LOQ-1) reconstructed video frame 116 prior to the up-sampling process. This may be used in place of the A (average) component within the transform block 218 to further improve the efficiency of the coding algorithm.

Figure 3:
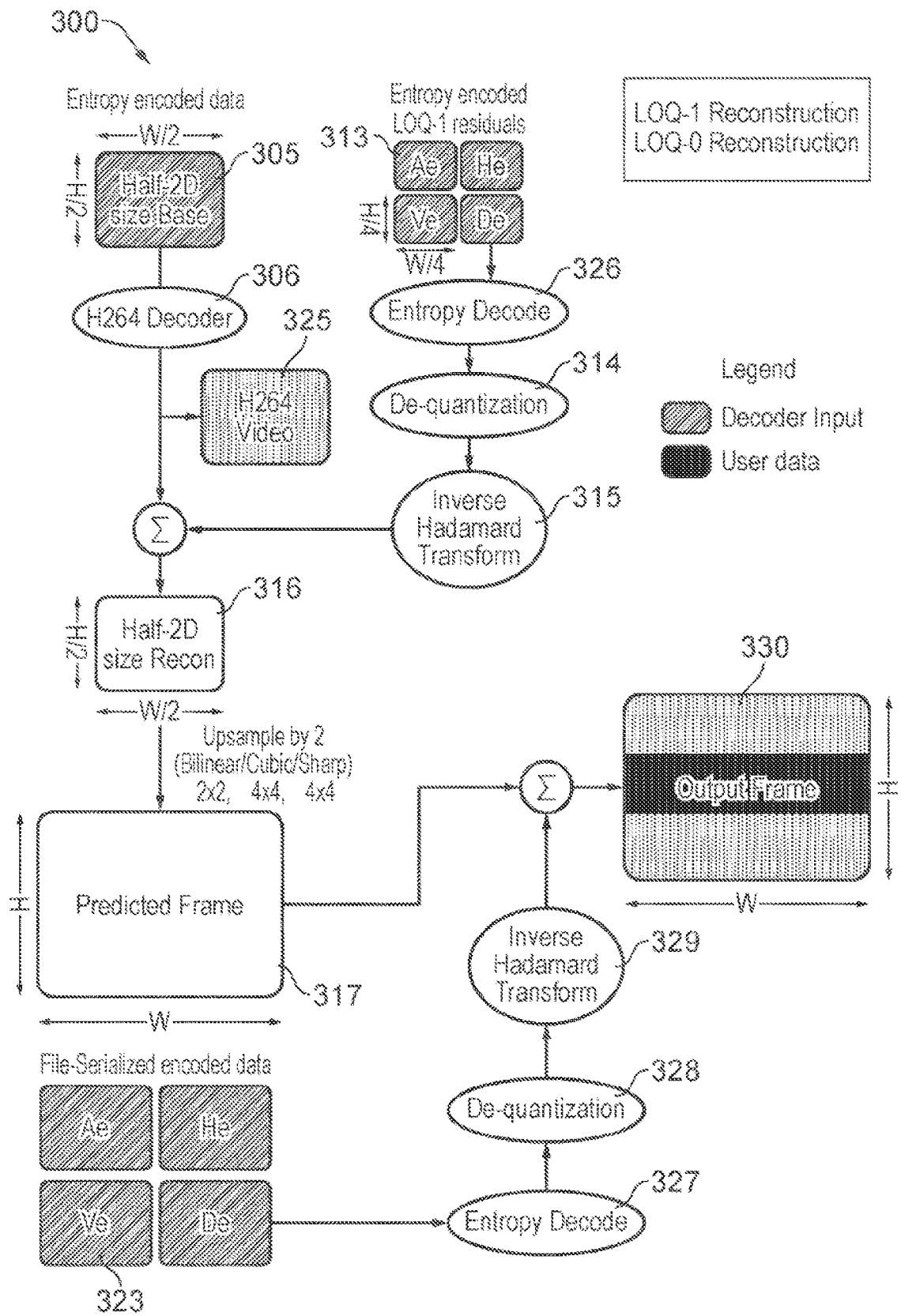
FIG. 3 shows a diagram depicting an example of a decoding process and system.

FIG. 3 shows schematically an example of how the decoding process 300 is performed. This decoding process 300 may be performed by a decoder.

The decoding process 300 begins with three input data streams. The decoder input thus consists of entropy-encoded data 305, the LOQ-1 entropy-encoded residuals data 313 and the LOQ-0 entropy-encoded residuals data 323 (represented in FIG. 3 as file-serialized encoded data). The entropy-encoded data 305 includes the reduced-size encoded base, e.g. data 105 as output in FIG. 1. The entropy-encoded data 305 is, for example, half-size, with dimensions W/2 and H/2 with respect to the full frame having dimensions W and H.

The entropy-encoded data 305 are decoded by a base decoder 306 using the decoding algorithm corresponding to the algorithm which has been used to encode those data (in this example, an AVC/H.264 decoding algorithm). This may correspond to the decoding entity 106 in FIG. 1. At the end of this step, a decoded video frame 325, having a reduced size (for example, half-size) is produced (indicated in the present example as an AVC/H.264 video). This may be viewed as a standard resolution video stream.

Figure 4:
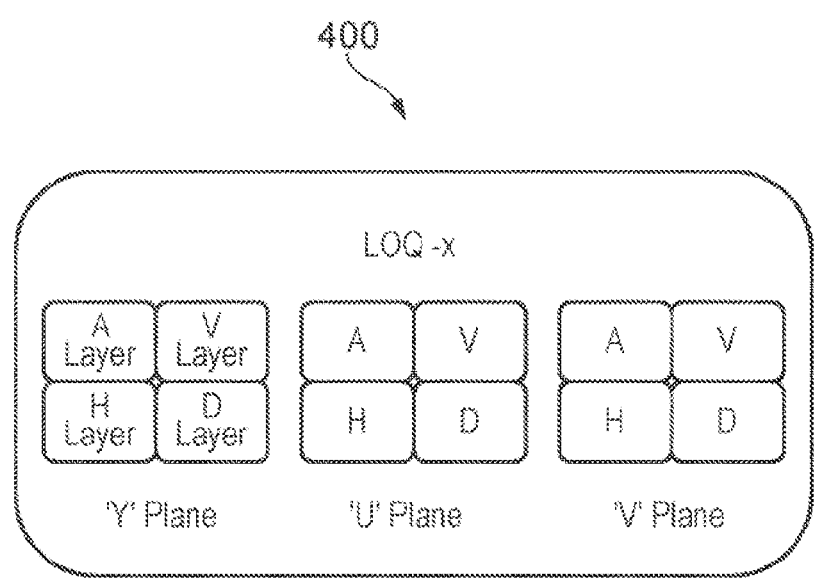
FIG. 4 shows a diagram depicting an example of a data structure for transformed residuals.

In parallel, the LOQ-1 entropy-encoded residuals data 313 are decoded. As explained above, the LOQ-1 residuals are encoded into four components (A, V, H and D) which, as shown in FIG. 3, have a dimension of one quarter of the full frame dimension, namely W/4 and H/4. This is because, as also described below and in previous patent applications U.S. Ser. No. 13/893,669 and PCT/EP2013/059847, the contents of which are incorporated herein by reference, the four components contain all the information associated with a particular direction within the untransformed residuals (e.g. the components are defined relative to a block of untransformed residuals). As described above, the four components may be generated by applying a 2×2 transform kernel to the residuals whose dimension, for LOQ-1, would be W/2 and H/2, in other words the same dimension as the reduced-size, entropy-encoded data 305. In the decoding process 300, as shown in FIG. 4, the four components are entropy-decoded at entropy decode block 326, then de-quantized at de-quantization block 314 before an inverse transform is applied via inverse transform block 315 to generate a representation of the original LOQ-1 residuals (e.g. the input to transform block 107 in FIG. 1). The inverse transform may comprise a Hadamard inverse transform, e.g. as applied on a 2×2 block of residuals data. The de-quantization block 314 is the reverse of the quantization block 108 described above with reference to FIG. 1. At this stage, the quantized values (i.e. the output of the entropy decode block 326) are multiplied by the step-width (i.e. stepsize) factor to generate reconstructed transformed residuals (i.e. components or coefficients). It may be seen that blocks 114 and 115 in FIG. 1 mirror blocks 314 and 315 in FIG. 3.

The decoded LOQ-1 residuals, e.g. as output by the inverse transform block 315, are then added to the decoded video frame, e.g. the output of base decode block 306, to produce a reconstructed video frame 316 at a reduced size (in this example, half-size), identified in FIG. 3 as "Half-2D size Recon". This reconstructed video frame 316 is then up-sampled to bring it up to full resolution (e.g. the $0^{th}$ level of quality from the $1^{st}$ level of quality) using an up-sampling filter such as bilinear, bicubic, sharp, etc. In this example, the reconstructed video frame 316 is up-sampled from half width (W/2) and half height (H/2) to full width (W) and full height (H)).

The up-sampled reconstructed video frame 317 will be a predicted frame at LOQ-0 (full-size, W×H) to which the LOQ-0 decoded residuals are then added.

In FIG. 3, the LOQ-0 encoded residual data 323 are decoded using an entropy decode block 327, a de-quantization block 328 and an inverse transform block 329. As described above, the LOQ-0 residuals data 323 are encoded using four components (i.e. are transformed into A, V, H and D components) which, as shown in FIG. 3, have a dimension of half the full frame dimension, namely W/2 and H/2. This is because, as described herein and in previous patent applications U.S. Ser. No. 13/893,669 and PCT/EP2013/059847, the contents of which are incorporated herein by reference, the four components contain all the information relative to the residuals and are generated by applying a 2×2 transform kernel to the residuals whose dimension, for LOQ-0, would be W and H, in other words the same dimension of the full frame. The four components are entropy-decoded by the entropy decode block 327, then de-quantized by the de-quantization block 328 and finally transformed 329 back into the original LOQ-0 residuals by the inverse transform block 329, transform (e.g., in this example, a 2×2 Hadamard inverse transform).

The decoded LOQ-0 residuals are then added to the predicted frame 317 to produce a reconstructed full video frame 330. The frame 330 is an output frame, having height H and width W. Hence, the decoding process 300 in FIG. 3 is capable of outputting two elements of user data: a base decoded video stream 325 at the first level of quality (e.g. a half-resolution stream at LOQ-1) and a full or higher resolution video stream 330 at a top level of quality (e.g. a full-resolution stream at LOQ-0).

The above description has been made with reference to specific sizes and baseline algorithms. However, the above methods apply to other sizes and/or baseline algorithms. The above description is only given by way of example of the more general concepts described herein.

FIG. 4 shows a representation of an example residuals data structure 400.

In the encoding/decoding algorithm described above, there are typically three planes (for example, YUV or RGB), with two level of qualities (LOQs) which are described as LOQ-0 (or top level, full resolution) and LOQ-1 (or lower level, reduced-size resolution such as half resolution) in every plane. Each plane may relate to a different colour component of the video data. Every LOQ contains four components, namely A, H, V and D. In certain examples, these may be seen as different layers within each plane. A frame of video data at a given level of quality may thus be defined by a set of planes, where each plane has a set of layers. In the examples of FIGS. 1-3, there are a total of 2×3×4=24 surfaces, i.e. 2 levels of quality, 3 colour components, and 4 layers of components or coefficients. As described with reference to FIGS. 1 and 2, 12 of these surfaces are full size (for example, W×H for LOQ-0) and 12 are reduced-size (for example, W/2×H/2 for LOQ-1).

As described above, a Directed-Decomposition transform (DD-Transform) may be used to decompose an error component (i.e. the difference or residuals) between the down-sampled input frame 103 and the decoded, baseline reduced-size version of the same frame (e.g. as output by decoding entity 106) into four distinct components; average (A), horizontal (H), vertical (V) and diagonal (D). This operation may be performed in grid sizes of 2×2 blocks. Each grid has no dependency with its neighbours. It is therefore suitable for efficient implementation, such as a fully parallel operation. However, since all the operations used for the decomposition are linear, it is feasible to perform this operation using the Just-In-Time (JIT) processing paradigm (on-the-fly).

Figure 5:
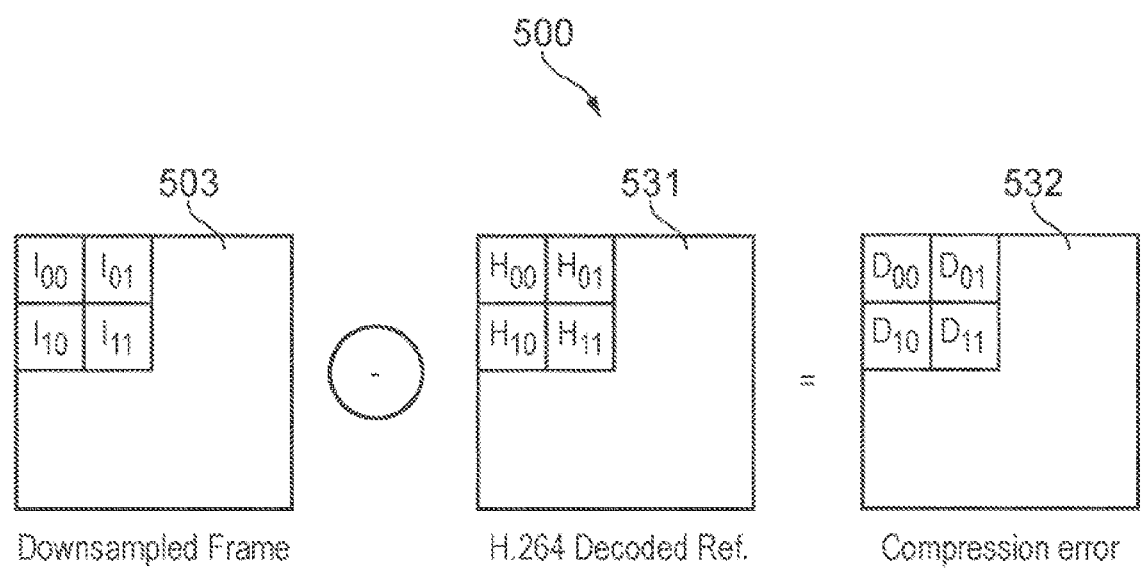
FIG. 5 shows a diagram depicting an example of a compression error calculation.

FIG. 5 shows an example of a compression error calculation that may be performed for the first level of quality (LOQ-1) 500.

In FIG. 5, a set of LOQ-1 residuals are calculated as the difference between a baseline reference decoded frame 531 (e.g. an output of decoding entity 106 in FIG. 1) and a down-sampled input frame 503 (e.g. the down-sampled frame 103 in FIG. 1. In FIG. 5, the baseline decoded frame 531 is an H.264-based frame, which is subtracted from the down-sampled frame 503 to obtain the set of LOQ-1 residuals 532. The set of LOQ-1 residuals may be seen as a "compression error", as they represent a difference between an input to a base encoder and a decoded output of the same base encoder, i.e. differences between data 503 and 531 may be seen as resulting from the encoding and decoding process for the base stream, wherein these differences are typically the result of lossy encoding algorithms applied by the base encoder. As well as compression errors the LOQ-1 residuals 532 may also represent other artefacts generated by the process of base encoding and base decoding, which may include motion correction artefacts, blocking artefacts, quantization artefacts, symbol encoding artefacts, etc.

Figure 6:
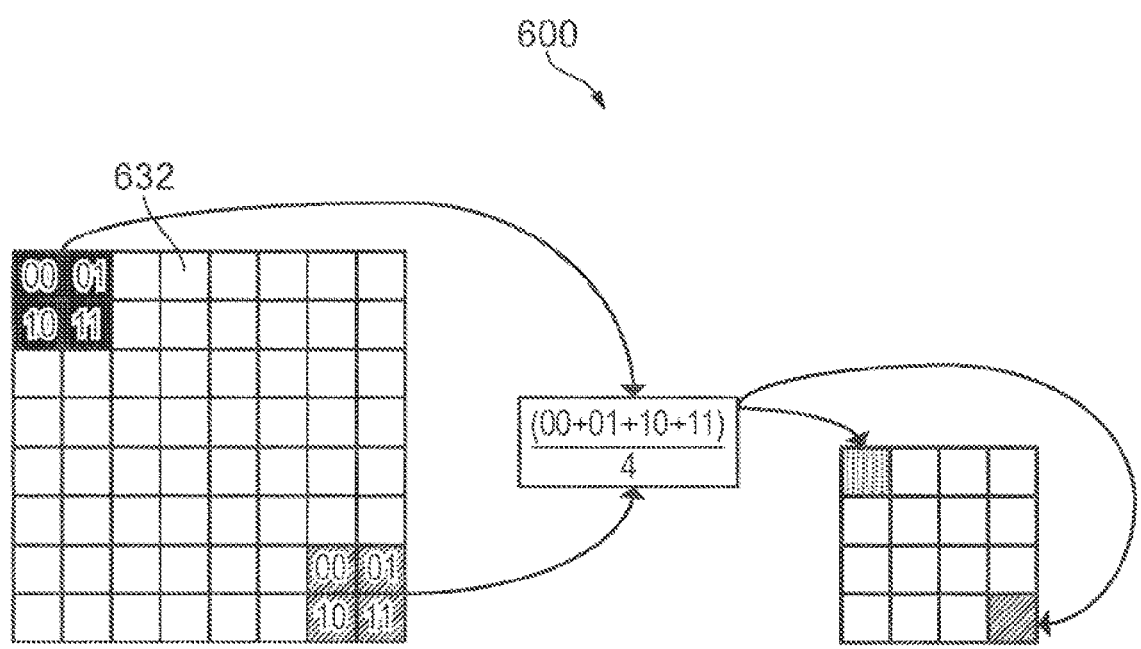
FIG. 6 shows a diagram depicting an example of an average decomposition process.

FIG. 6 shows an example of an average decomposition process 600 that may be used for the first level of quality (LOQ-1). For example, the average decomposition process 600 may be used to determine an Average—A—component as described above. In FIG. 6, the average decomposition is computed as the average of all compression error pixels (residuals) in a current 2×2 grid of the compression error 632 frame. The average decomposition may be repeated for a plurality of 2×2 grids within the compression error 632 frame, e.g. FIG. 6 shows a first and last 2×2 grid or coding block for the frame. The average decomposition may be performed in a manner similar to the down-sampling shown by arrow 101 in FIG. 1.

Figure 7:
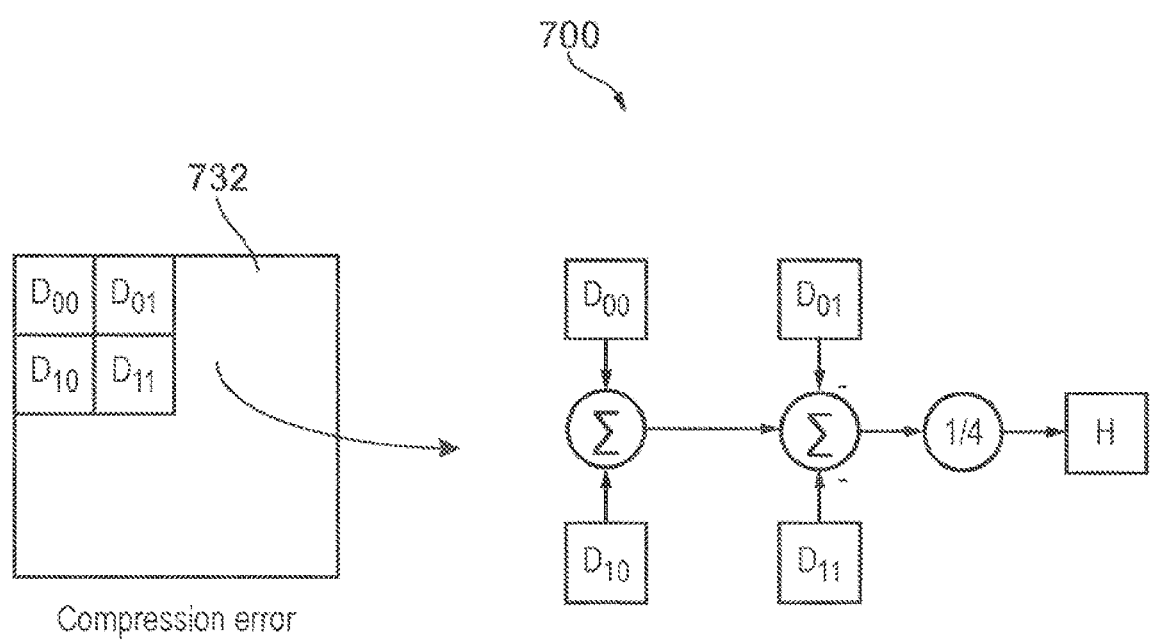
FIG. 7 shows a diagram depicting an example of a horizontal decomposition process.

FIG. 7 shows an example of a horizontal decomposition process 700 that may be used for the first level of quality (LoQ-1). For example, the horizontal decomposition process 700 may be used to determine a Horizontal—H—component as described above. In FIG. 7, the operation calculates the normalized difference in the horizontal plane between residuals in the 2×2 grid of the compression error frame 732. For example, as shown in FIG. 7, residual values in the first column of the 2×2 grid ($D_{00}$ and $D_{10}$) are summed and then the residual values in the second column of the 2×2 grid ($D_{01}$ and $D_{11}$) are subtracted from the sum. In FIG. 7, a normalising division by 4 is applied to generate the Horizontal—H—component. The operation to derive the horizontal decomposition is a linear process and hence can be performed on-the-fly if required. Visually, the result of this operation will look largely vertical in nature if any distinct errors (residuals) exist across the plane. Ideally, similar errors (residuals) will exist in the plane (no added entropy) and hence will result in a reduction in the amount of data being compressed via the entropy encoder.

Figure 8:
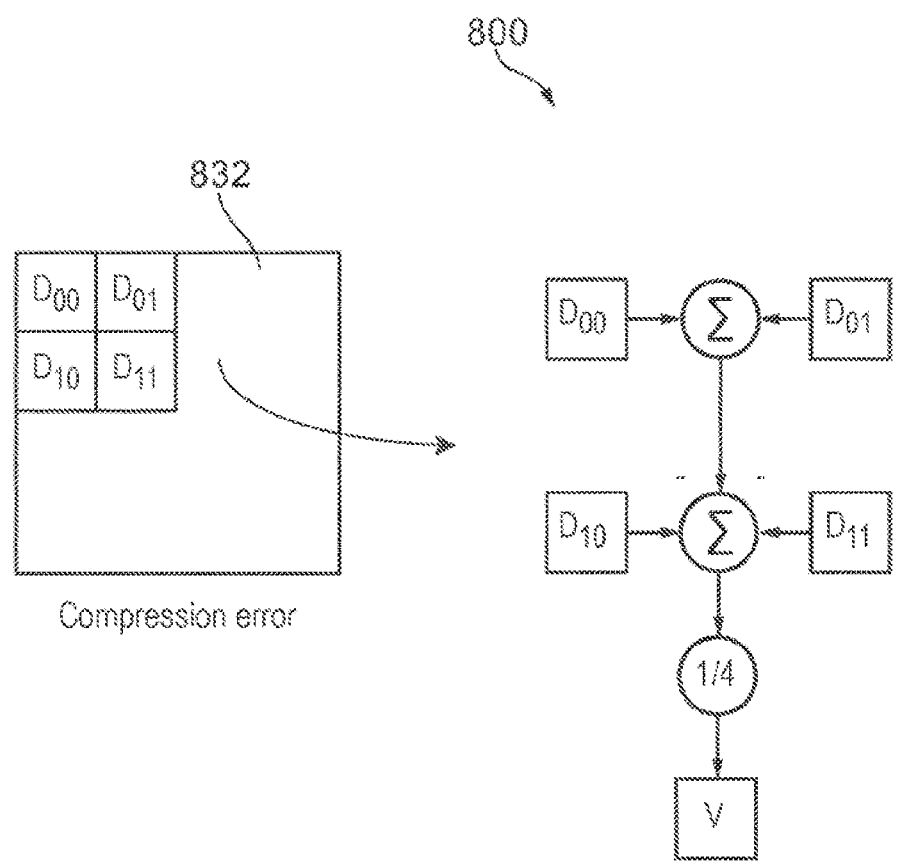
FIG. 8 shows a diagram depicting an example of a vertical decomposition process.

FIG. 8 shows an example of vertical decomposition process 800 that may be used for the first level of quality (LoQ-1). For example, the vertical decomposition process 800 may be used to determine a Vertical—V—component as described above. This operation calculates the normalized difference in the vertical plane between residuals in the 2×2 grid of the compression error frame 832. For example, as shown in FIG. 8, residual values in the first row of the 2×2 grid ($D_{00}$ and $D_{01}$) are summed and then the residual values in the second row of the 2×2 grid ($D_{10}$ and $D_{11}$) are subtracted from the sum. In FIG. 8, a normalising division by 4 is applied to generate the Vertical—V—component. The operation to derive the vertical decomposition is a linear process and hence can be performed on-the-fly if required, e.g. as 2×2 sets of residuals are received at a transform block such as 107.

Figure 9:
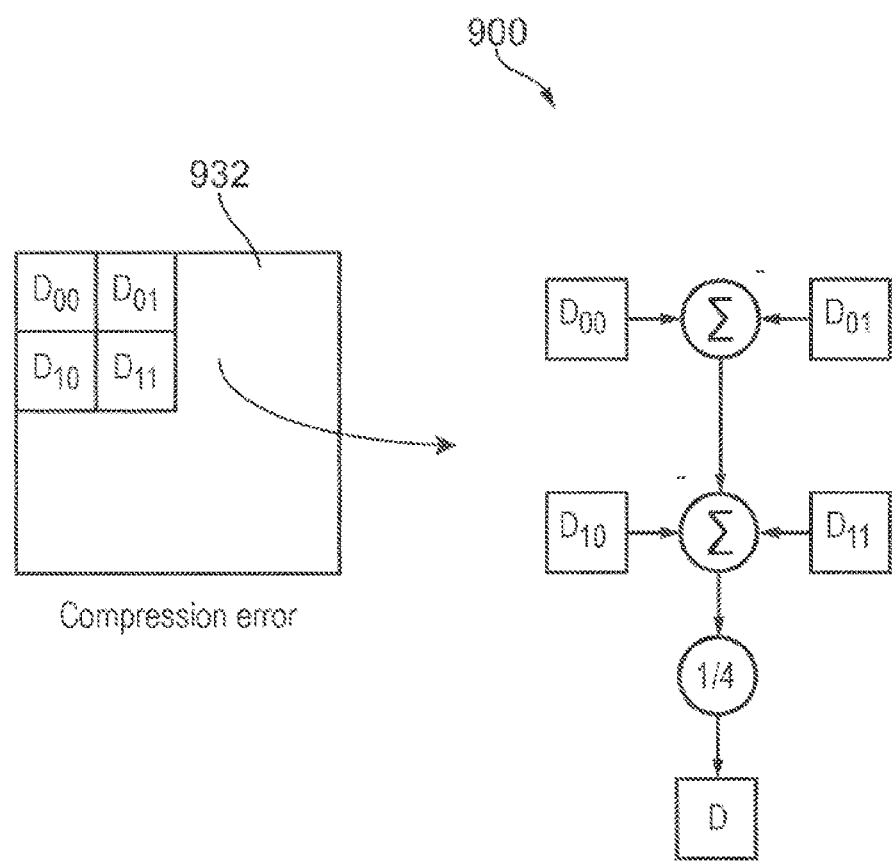
FIG. 9 shows a diagram depicting an example of a diagonal decomposition process.

FIG. 9 shows an example of diagonal decomposition process 900 that may be used for the first level of quality (LoQ-1). For example, the diagonal decomposition process 900 may be used to determine a Diagonal—D—component as described above. This operation calculates the normalized difference in the diagonal plane between residuals in the 2×2 grid of the compression error frame 932. For example, as shown in FIG. 9, a difference of residual values in the first row of the 2×2 grid ($D_{00}$ and $D_{01}$) is determined and then a difference of the residual values in the second row of the 2×2 grid ($D_{10}$ and $D_{11}$) is added. In FIG. 9, a normalising division by 4 is applied to generate the Diagonal—D—component.

Figure 10:
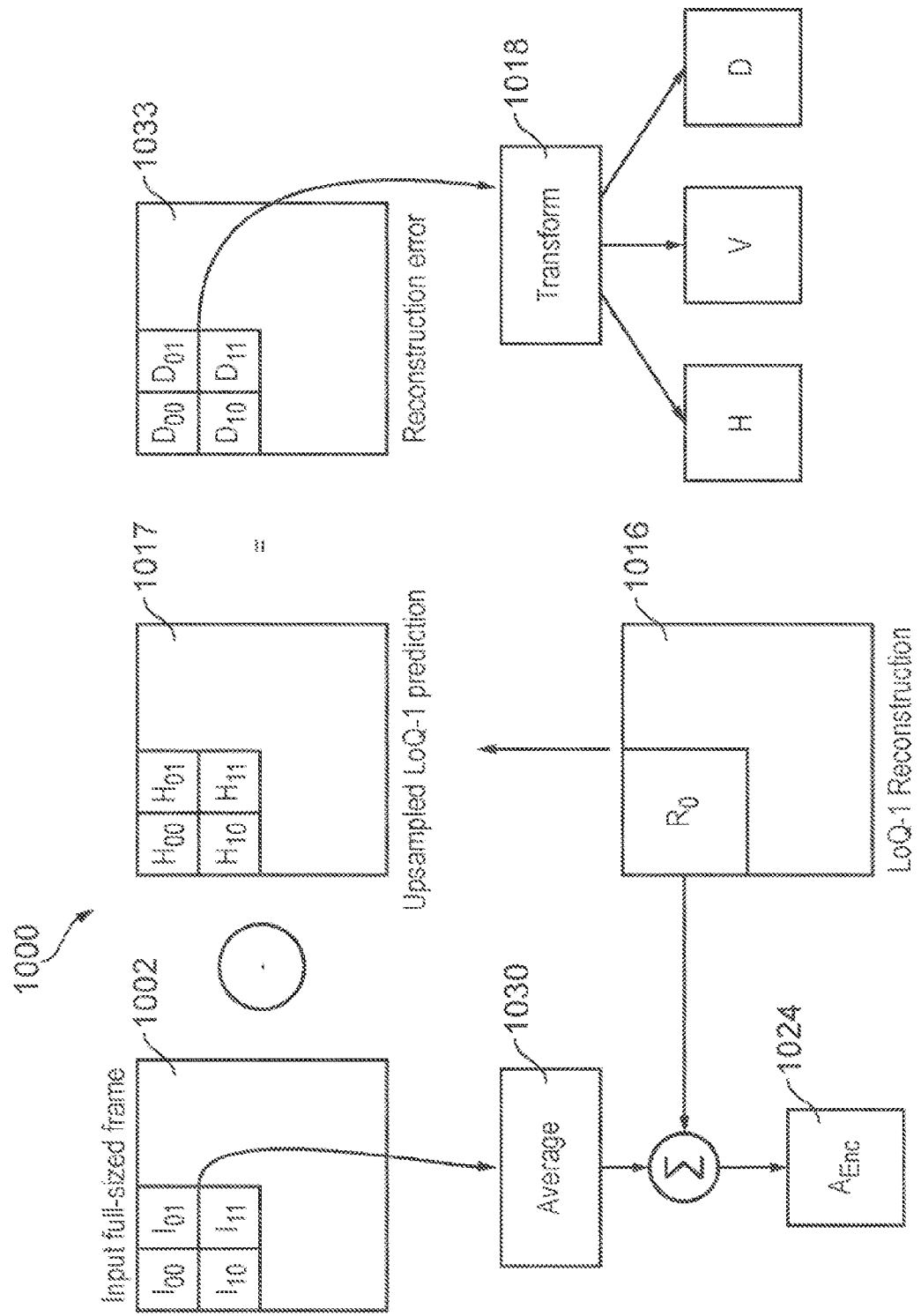
FIG. 10 shows a diagram depicting an example of an LoQ-0 average decomposition calculation.

FIG. 10 shows an example directed decomposition (DD) transform process 1000 that may be performed at the upper level of quality (LoQ-0). In FIG. 10, an LoQ-1 reconstructed frame 1016 is up-sampled. As described with reference to FIGS. 1 and 2, the reconstructed frame 1016 may comprise a sum of the decoded LOQ-1 residuals (e.g. as output by the inverse transform block 115) and a decoded base encoded frame (e.g. as output by decoding entity 106). In this case, up-sampling takes a single reconstructed frame pixel $R_0$ and converts it into a 2×2 block of up-sampled LOQ-1 predictions (see above). This may be performed for all reconstructed frame pixel values in the LoQ-1 reconstructed frame 1016. In FIG. 10, the up-sampled LOQ-1 predictions are then subtracted from the full-sized input frame 1002 in order to generate residuals 1033 for the LoQ-0 processing stage. The horizontal, vertical and diagonal decompositions for LoQ-0 may be calculated in a similar manner to that described above for LOQ-1. However, the average decomposition may be calculated differently to reduce an entropy of the quantized transformed LOQ-0 residuals to be encoded.

In FIG. 10, the reconstructed pixel value, $R_0$, from the previous stage (LoQ-1) is used in the calculation of the average component 1024 for the LOQ-0 transformed residuals data rather than recalculating the average value from the reconstruction error 1033. For example, at the transform block 218 in FIG. 2, the Average—A—value may not be determined using the input data from the sum of 217 and 202 as for the H, V and D components. By using the configuration of FIG. 10 the calculation may produce fewer errors (residuals) if the pre-upsampled data 1016 is used. This effectively excludes any extra errors owing to the up-sampling filters and hence will result in reduced entropy at the input of the entropy encoders.

In particular, $R_0$ is the reconstructed element at level LOQ-1 obtained by adding the decoded reduced-size frame to the LOQ-1 residuals as described above. The single element $R_0$, when up-sampled, would result in four elements in the up-sampled LOQ-1 prediction frame 1017, namely $H_{00}$, $H_{01}$, $H_{10}$ and $H_{11}$, assuming an up-sample from half size to full size. In FIG. 10, the reconstructed element $R_0$ is subtracted from the average of the four elements in the original image 1002, namely $I_{00}$, $I_{01}$, $I_{10}$ and $I_{11}$, corresponding in position to the four elements in the up-sampled LoQ-1 prediction frame 1017, $H_{00}$, $H_{01}$, $H_{10}$ and $H_{11}$. For example, the average at block 1030 may be generated in a similar manner to the computation of FIG. 6. The resulting average, denoted "$A_{enc}$", 1024 is then quantized and encoded for transmission to the decoder, e.g. instead of an Average—A—output of the LOQ-0 transform block 1018. Where the average of the four elements in the original image 1002, namely $I_{00}$, $I_{01}$, $I_{10}$ and $I_{11}$, is denoted $A_I$, then $A_{enc}=A_I-R_0$. The resulting encoding average 1024 may be generated for multiple 2×2 blocks or grids throughout the complete frame.

Using $A_{enc}$ rather than the standard average A (which would be the average of the reconstruction errors $D_{00}$ to $D_{11}$ in the 2×2 block shown in 1033) is effective since the entropic content of $A_{enc}$ is lower than that of the average (A) and therefore it results in a more efficient encoding. This is because, if $R_0$ has been reconstructed correctly (for example, the error introduced by the encoder and decoder has been corrected properly by the LOQ-1 residuals), then the difference between $R_0$ and the average of the four original elements of the input frame 1002 should, in most cases, be zero. On the other hand, the standard average (A) would contain significantly fewer zero values since the effects of the up-sampler and down-sampler would be taken into account.

Figure 11:
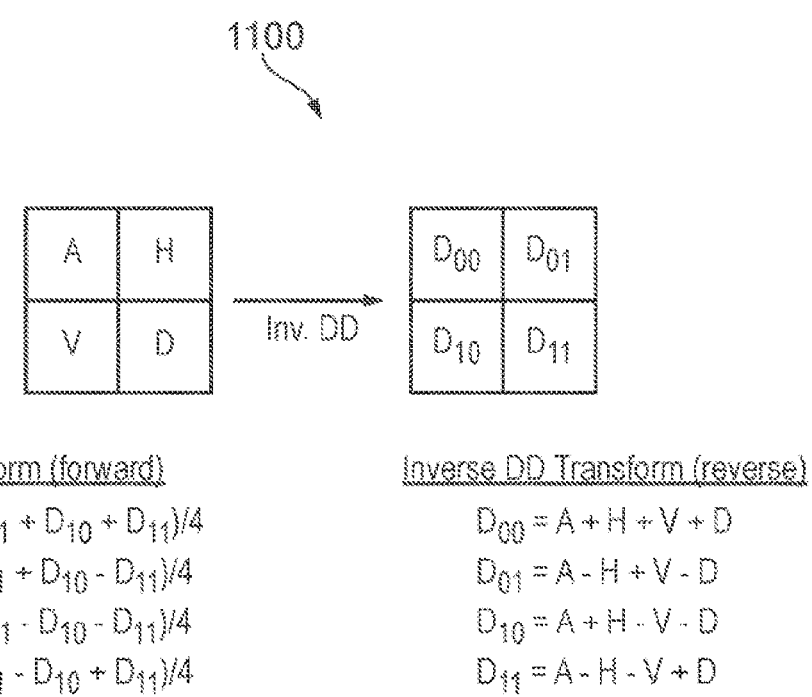
FIG. 11 shows a diagram depicting an example of an inverse directed decomposition (DD) transform process (LOQ-1)

FIG. 11 shows an example of an inverse DD transform 1100. For example, this may be used to perform the inverse transform at one of the blocks 115, 314 in FIGS. 1 and 3.

The aim of this process 1100 is to convert the (directional) decomposed values back into the original residuals. The residuals were the values which were derived by subtracting the reconstructed video frame from the ideal input (or down-sampled) frame. The inverse DD transform 1100 shown in FIG. 11 is an LoQ-1 inverse transform performed at LoQ-1. The LoQ-0 inverse transform performed at LoQ-0 may be different in the case that a predicted average is used. One example of a different implementation is described below with reference to FIG. 12.

FIG. 12 shows an example of an LoQ-0 inverse transform 1200 that may use the encoding average 1024 described with reference to FIG. 10.

Owing to the method used to decompose into the average component there is a difference in calculating the inverse transform for LoQ-0 compared to LoQ-1. In particular, an extra step is used to re-form the average component so that it conforms to the 'input-minus-predicted-residual' format. This is used so that the inverse calculations can be performed.

As described above, the $A_{enc}$ component corresponds to the average (A) component computed by subtracting $R_0$ (the LOQ-1 reconstruction element) from the average of the corresponding elements in the original input frame ($I_{00}$ to $I_{11}$), which can be expressed as $A_{enc}=A_I-R_0$. Where the average value of the 2×2 grid of the up-sampled and reconstructed LoQ-1 frame is denoted $A_U$, then $A=A_I-A_U$ since the average (A) at LoQ-0 is based on the difference between the elements in the original input frame and the elements in the up-sampled and reconstructed LoQ-1 frame. This can be rewritten as $A=\{A_I-R_0\}+\{R_0-A_U\}$ or, using the above equation for $A_{enc}$, $A=A_{enc}+\{R_0-A_U\}$. The reformed average ($A_{reformed}$) therefore consists of adding the LOQ-1 reconstruction element, $R_0$, to the decoded $A_{enc}$ (referred to as $A_{invvQ}$ in FIG. 12—i.e. $A_{enc}$ that is entropy decoded and de-quantised) and subtracting the average value of the 2×2 grid of the up-sampled and reconstructed LoQ-1 frame, $A_U$. As such, decoder-side, $A_{reformed}=A_{invvQ}R_0-A_U$. As can be seen in the formula shown in FIG. 12, the resulting equation corresponds to what should have been the actual average (A) component to be encoded at the encoder. Following this, the same steps as described in FIG. 11 are performed (with A in the reverse transform substituted by $A_{reformed}$) in order to generate the residuals $D_{00}$ to $D_{11}$.

The present disclosure describes a method for encoding and decoding a signal, in particular a video signal and/or an image signal.

There is described a method of encoding a signal, the method comprising receiving an input frame and processing the input frame to generate at least one first set of residual data, said residual data enabling a decoder to reconstruct the original frame from a reference reconstructed frame.

In some examples, the method comprises obtaining the reconstructed frame from a decoded frame obtained from a decoding module, wherein the decoding module is configured to generate said decoded frame by decoding a first encoded frame which has been encoded according to a first encoding method. The method further comprises down-sampling the input frame to obtain a down-sampled frame, and passing said down-sampled frame to an encoding module configured to encode said down-sampled frame in accordance with the first encoding method in order to generate the first encoded frame. Obtaining the reconstructed frame may further comprise up-sampling the decoded frame to generate the reconstructed frame.

In some examples, the method comprises obtaining the reconstructed frame from a combination of a second set of residual data and a decoded frame obtained from a decoding module, wherein the decoding module is configured to generate said decoded frame by decoding a first encoded frame which has been encoded according to a first encoding method. The method further comprises down-sampling the input frame to obtain a down-sampled frame and passing said down-sampled frame to an encoding module configured to encode said down-sampled frame in accordance with the first encoding method in order to generate the first encoded frame. The method further comprises generating said second set of residual data by taking a difference between the decoded frame and the down-sampled frame. The method further comprises encoding said second set of residual data to generate a first set of encoded residual data. Encoding said second set of residual data may be performed according to a second encoding method. The second encoding method comprises transforming the second set of residual data into a transformed second set of residual data. Transforming the second set of residual data comprises selecting a subset of the second set of residual data, and applying a transformation on said subset to generate a corresponding subset of transformed second set of residual data. One of the subset of transformed second set of residual data may be obtained by averaging the subset of the second set of residual data. Obtaining the reconstructed frame may further comprise up-sampling the combination of the second set of residual data and a decoded frame to generate the reconstructed frame.

In some examples, generating the at least one set of residual data comprises taking a difference between the reference reconstructed frame and the input frame. The method further comprises encoding said first set of residual data to generate a first set of encoded residual data. Encoding said first set of residual data may be performed according to a third encoding method. The third encoding method comprises transforming the first set of residual data into a transformed first set of residual data. Transforming the first set of residual data comprises selecting a subset of the first set of residual data, and applying a transformation on said subset to generate a corresponding subset of transformed first set of residual data. One of the subsets of transformed first set of residual data may be obtained by the difference between an average of a subset of the input frame and a corresponding element of the combination of the second set of residual data and the decoded frame.

There is also described a method of decoding a signal, the method comprising receiving an encoded frame and at least one set of encoded residual data. The first encoded frame may be encoded using a first encoding method. The at least one set of residual data may be encoded using a second and/or a third encoding method.

The method further comprises passing the first encoded frame to a decoding module, wherein the decoding module is configured to generate a decoded frame by decoding the encoded frame which has been encoded according to a first encoding method.

The method further comprises decoding the at least one set of encoded residual data according to the respective encoding method used to encode them.

In some examples, a first set of encoded residual data is decoded by applying a second decoding method corresponding to said second encoding method to obtain a first set of decoded residual data. The method further comprises combining the first set of residual data with the decoded frame to obtain a combined frame. The method further comprises up-sampling the combined frame to obtain a reference decoded frame.

The method further comprises decoding a second set of encoded residual data by applying a third decoding method corresponding to said third encoding method to obtain a second set of decoded residual data. The method further comprises combining the second set of decoded residual data with the reference decoded frame to obtain a reconstructed frame.

In some examples, the method comprises up-sampling the decoded frame to obtain a reference decoded frame.

The method further comprises decoding a set of encoded residual data by applying a second or third decoding method corresponding to said second or third encoding method to obtain a set of decoded residual data. The method further comprises combining the set of decoded residual data with the reference decoded frame to obtain a reconstructed frame.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of decoding a signal, the method comprising:
  receiving an encoded frame and first and second sets of encoded residual data;
  passing the encoded frame to a decoding module, the decoding module being configured to generate a decoded frame by decoding the encoded frame;
  decoding the first and second sets of encoded residual data to generate first and second sets of reconstructed residual data, wherein the decoding comprises transforming the first and second sets of encoded residual data into reconstructed first and second sets of residual data respectively;
  combining the first set of reconstructed residual data with the decoded frame to obtain a combined frame;
  up-sampling the combined frame to obtain a reference decoded frame; and
  combining the second set of reconstructed residual data with the reference decoded frame to obtain a reconstructed frame.

2. The method according to claim 1, wherein the decoding module is configured to decode the encoded frame in accordance with a first decoding method in order to generate the decoded frame, and wherein:
  the decoding of the first set of encoded residual data is performed according to a second decoding method, the second decoding method being different from the first decoding method; and/or
  the decoding of the second set of encoded residual data is performed according to a third decoding method, the third decoding method being different from the first decoding method.

3. The method according to claim 1, wherein the decoding module is configured to use a block-based coding algorithm.

4. The method according to claim 1, wherein the first set of encoded residual data represents a compression error associated with the decoding module.

5. The method according to claim 1, wherein the second set of encoded residual data represents a reconstruction error.

6. The method according to claim 1, wherein the method is performed in a hierarchical coding system having exactly two hierarchical levels.

7. The method according to claim 6, wherein one of the two hierarchical levels corresponds to a baseline layer and the other one of the two hierarchical levels corresponds to an enhancement layer.

8. The method according to claim 1, wherein the transforming uses a Hadamard-based transform.

9. The method according to claim 1, wherein the transforming uses a 2×2 transform kernel.

10. The method according to claim 1, wherein the transforming of the first set of encoded residual data comprises:
selecting a subset of the first set of encoded residual data; and
applying a transformation on the subset of the first set of encoded residual data to generate a corresponding subset of the transformed first set of encoded residual data.

11. The method according to claim 10, wherein one of the subset of the transformed first set of encoded residual data is obtained by averaging the subset of the first set of encoded residual data.

12. The method according to claim 1, wherein the transforming of the second set of encoded residual data comprises:
selecting a subset of the second set of encoded residual data; and
applying a transformation on the subset of the second set of encoded residual data to generate a corresponding subset of the transformed encoded second set of residual data.

13. The method according to claim 12, wherein one of the subset of the transformed second set of encoded residual data is obtained by the difference between:
an average of a subset of the encoded frame; and
a corresponding element of the combination of the first set of encoded residual data and the encoded frame.

14. The method according to claim 1, wherein the decoding comprises quantizing at least some of the transformed first and second sets of encoded residual data respectively into quantized first and second sets of encoded residual data respectively.

15. The method according to claim 14, wherein the decoding comprises entropy-encoding the quantized first and second sets of encoded residual data respectively into entropy-encoded first and second sets of encoded residual data.

16. The method according to claim 1, wherein the signal comprises a video signal and/or an image signal.

17. A decoder configured to:
receive an encoded frame and first and second sets of encoded residual data;
pass the encoded frame to a decoding module, the decoding module being configured to generate a decoded frame by decoding the encoded frame;
decode the first and second sets of encoded residual data to generate first and second sets of reconstructed residual data, wherein the decoding comprises transforming the first and second sets of encoded residual data into reconstructed first and second sets of residual data respectively;
combine the first set of reconstructed residual data with the decoded frame to obtain a combined frame;
up-sample the combined frame to obtain a reference decoded frame; and
combine the second set of reconstructed residual data with the reference decoded frame to obtain a reconstructed frame.

\* \* \* \* \*